United States Patent [19]
Lawrence

[11] Patent Number: 5,583,414
[45] Date of Patent: Dec. 10, 1996

[54] SYSTEMS FOR CHARGING BATTERIES OF BOATS WHILE BEING TOWED

[76] Inventor: Raymond A. Lawrence, 6300 Sutton Rd., Bauxite, Ark. 72011

[21] Appl. No.: 187,205

[22] Filed: Jan. 27, 1994

[51] Int. Cl.⁶ .................................................. H01M 10/46
[52] U.S. Cl. .................................................. 320/15; 320/2
[58] Field of Search ..................... 320/6, 7, 15; 280/422; 180/53.5; 248/58, 62

[56] References Cited

U.S. PATENT DOCUMENTS

| | | | |
|---|---|---|---|
| 3,090,871 | 5/1962 | Gorman | 320/15 |
| 3,456,181 | 7/1969 | Godshalk | 320/25 |
| 4,647,139 | 5/1987 | Yang | 439/483 |
| 4,649,332 | 3/1987 | Bell | 320/7 |
| 4,829,223 | 5/1989 | Broberg | 320/2 |
| 4,885,524 | 12/1989 | Wilburn | 320/25 |
| 5,013,259 | 5/1991 | Maurer | 439/522 |

*Primary Examiner*—Peter S. Wong
*Assistant Examiner*—Patrick Law

[57] ABSTRACT

A system for charging batteries of boats while being towed comprising a vehicle primary battery with an anode and a cathode for electrically powering a vehicle during use, front electrical lines extending rearwardly with a receptacle fixed to the vehicle, the vehicle adapted to have a hitch at the rearward end thereof for towing a trailer. A secondary battery for powering a boat when in use in the water, the secondary battery having an anode and a cathode and rear electrical lines extending forwardly therefrom to a forward position for coupling with the front lines.

2 Claims, 4 Drawing Sheets

SYSTEMS FOR CHARGING BATTERIES OF BOATS WHILE BEING TOWED

BACKGROUND OF THE INVENTION

1. Field of the Invention

The present invention relates to systems for charging batteries of boats while being towed and more particularly pertains to charging batteries of a boat while the boat is being towed by a vehicle which is providing the charge.

2. Description of the Prior Art

The use of battery chargers for the purpose of charging depleted batteries is known in the prior art. More specifically, battery chargers for the purpose of charging depleted batteries heretofore devised and utilized for the purpose of charging batteries are known to consist basically of familiar, expected, and obvious structural configurations, notwithstanding the myriad of designs encompassed by the crowded prior art which has been developed for the fulfillment of countless objectives and requirements.

The prior art discloses a large number of devices used for charging batteries. By way of example, U.S. Pat. No. 3,456,181 to Godshalk discloses an auxiliary battery connecting apparatus.

U.S. Pat. No. 4,647,139 to Yang discloses an extension cord charging device for connecting tools and appliances to plug receptacle in vehicle.

U.S. Pat. No. 4,649,332 to Bell discloses a trolling motor battery connector system.

U.S. Pat. No. 4,829,223 to Broberg and U.S. Pat. No. 4,885,524 to Wilburn discloses vehicle battery chargers.

Lastly, U.S. Pat. No. 5,013,259 to Maurer discloses a remote auxiliary terminal assembly.

In this respect, the systems for charging batteries of boats while being towed according to the present invention substantially departs from the conventional concepts and designs of the prior art, and in doing so provides an apparatus primarily developed for the purpose of charging batteries of a boat while the boat is being towed by a vehicle which is providing the charge.

Therefore, it can be appreciated that there exists a continuing need for new and improved systems for charging batteries of boats while being towed which can be used for charging batteries of a boat while the boat is being towed by a vehicle which is providing the charge. In this regard, the present invention substantially fulfills this need.

SUMMARY OF THE INVENTION

In view of the foregoing disadvantages inherent in the known types of battery chargers for the purpose of charging depleted batteries now present in the prior art, the present invention provides improved systems for charging batteries of boats while being towed. As such, the general purpose of the present invention, which will be described subsequently in greater detail, is to provide new and improved systems for charging batteries of boats while being towed and method which has all the advantages of the prior art and none of the disadvantages.

To attain this, the present invention essentially comprises a new and improved system for charging a battery of a boat while being towed comprising a vehicle having a primary battery with an anode and a cathode for electrically powering the vehicle during use, front electrical lines extending rearwardly with a receptacle fixed to the vehicle, the vehicle also having a hitch at the rearward end thereof for towing a trailer. A trailer has wheels adjacent to the rearward end thereof and a coupler at the forward end thereof for coupling with the hitch of the vehicle for being pulled. A boat is positioned on the trailer, the boat having a secondary battery for powering the boat when in use in the water, the secondary battery having an anode and a cathode and rear electrical lines extending forwardly therefrom to a forward position. A plug is at the forward end off the rear lines, the plug being couplable to the receptacle in the vehicle. A receptacle is located in the boat at the forward end of the rear lines. Intermediate electrical lines with plugs are at each end for coupling the receptacles of the vehicle and the boat, the rear lines being couplable to the receptacle in the boat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved systems for charging batteries of boats while being towed which have all the advantages of the prior art battery chargers for the purpose of charging depleted batteries and none of the disadvantages.

It is another object of the present invention to provide new and improved systems for charging batteries of boats while being towed which may be easily and efficiently manufactured and marketed.

It is further object of the present invention to provide new and improved systems for charging batteries of boats while being towed which are of durable and reliable constructions.

An even further object of the present invention is to provide new and improved systems for charging batteries of boats while being towed which are susceptible of a low cost of manufacture with regard to both materials and labor, and which accordingly are then susceptible of low prices of sale to the consuming public, thereby making such systems for charging batteries of boats while being towed economically available to the buying public.

Still yet another object of the present invention is to provide new and improved systems for charging batteries of boats while being towed which provide in the apparatuses and methods of the prior art some of the advantages thereof, while simultaneously overcoming some of the disadvantages normally associated therewith.

Even still another object of the present invention is to charge batteries of a boat while the boat is being towed by a vehicle which is providing the charge.

Lastly, it is an object of the present invention to provide a new and improved system for charging batteries of boats while being towed comprising a vehicle primary battery with an anode and a cathode for electrically powering a vehicle during use, front electrical lines extending rearwardly with a receptacle fixed to the vehicle, the vehicle adapted to have a hitch at the rearward end thereof for towing a trailer. A secondary battery for powering a boat when in use in the water, the secondary battery having an anode and a cathode and rear electrical lines extending forwardly therefrom to a forward position for coupling with the front lines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
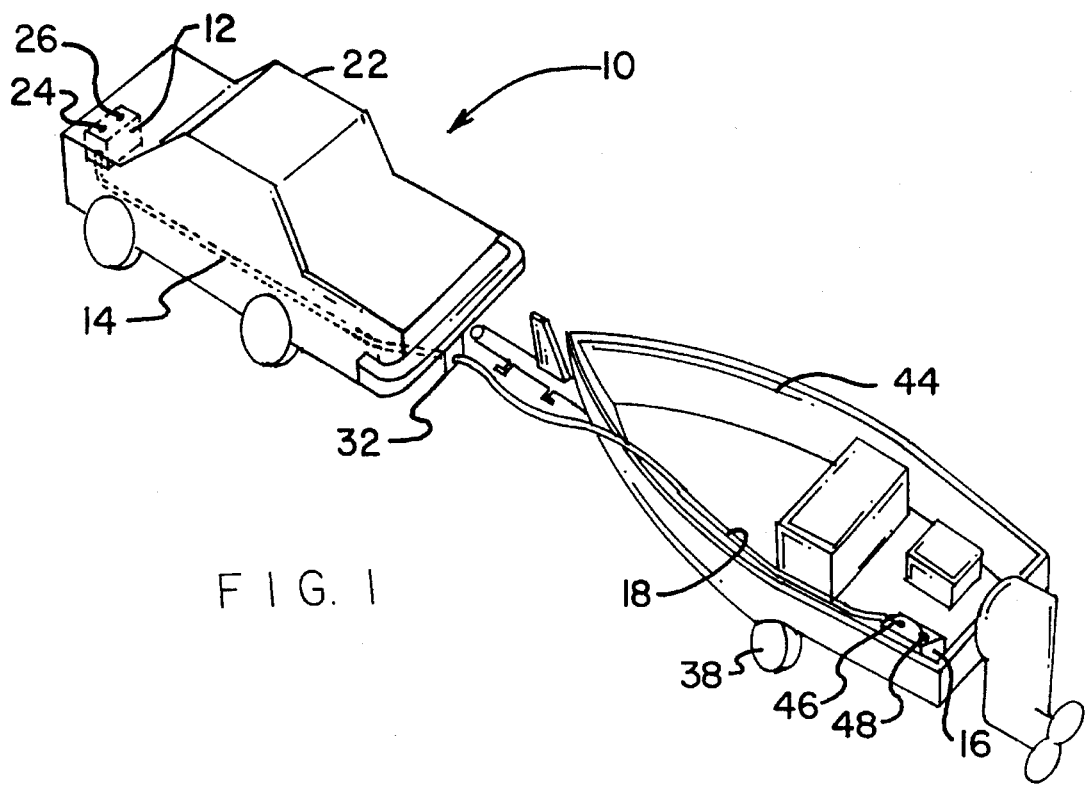
FIG. 1 is a perspective view of the preferred embodiment of the systems for charging batteries of boats while being towed constructed in accordance with the principles of the present invention.

With reference now to the drawings, and in particular to FIG. 1 thereof, the preferred embodiment of the new and improved systems for charging batteries of boats while being towed embodying the principles and concepts of the present invention and generally designated by the reference numeral 10 will be described.

Figure 2:
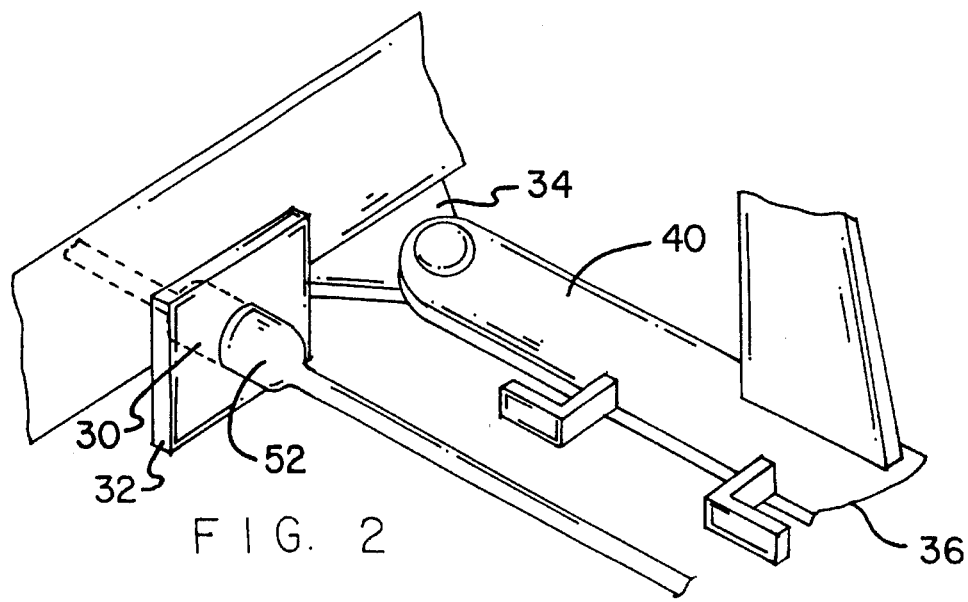
FIG. 2 is a perspective illustration of the coupling of the coupling wire between the vehicle and the battery of the boat.
Figure 3:
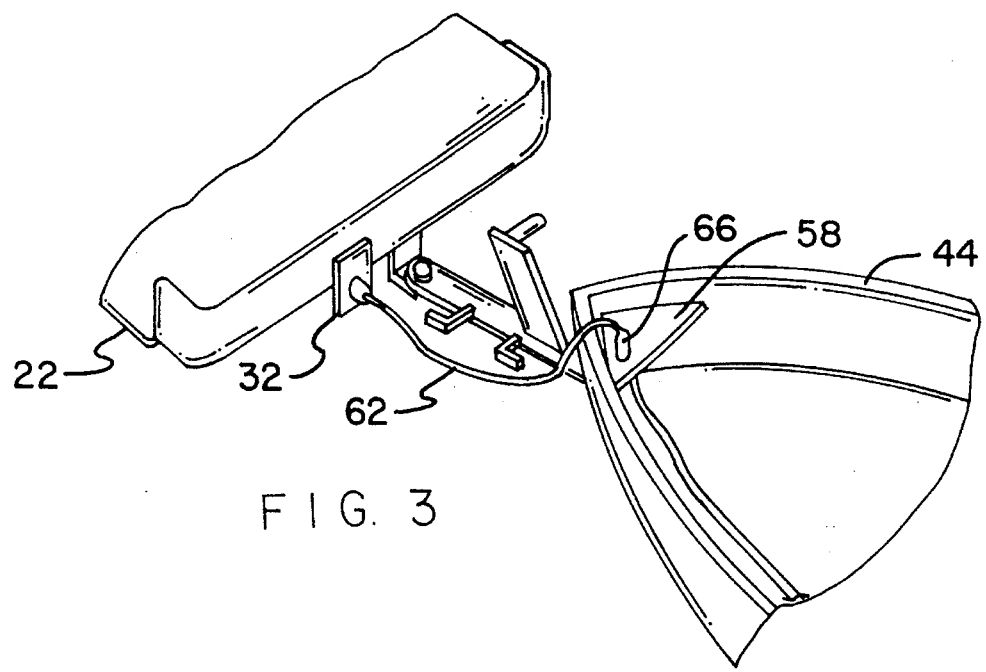
FIG. 3 is a perspective view of the connecting components between the vehicle and the boat constructed in accordance with an alternate embodiment of the invention.
Figure 4:
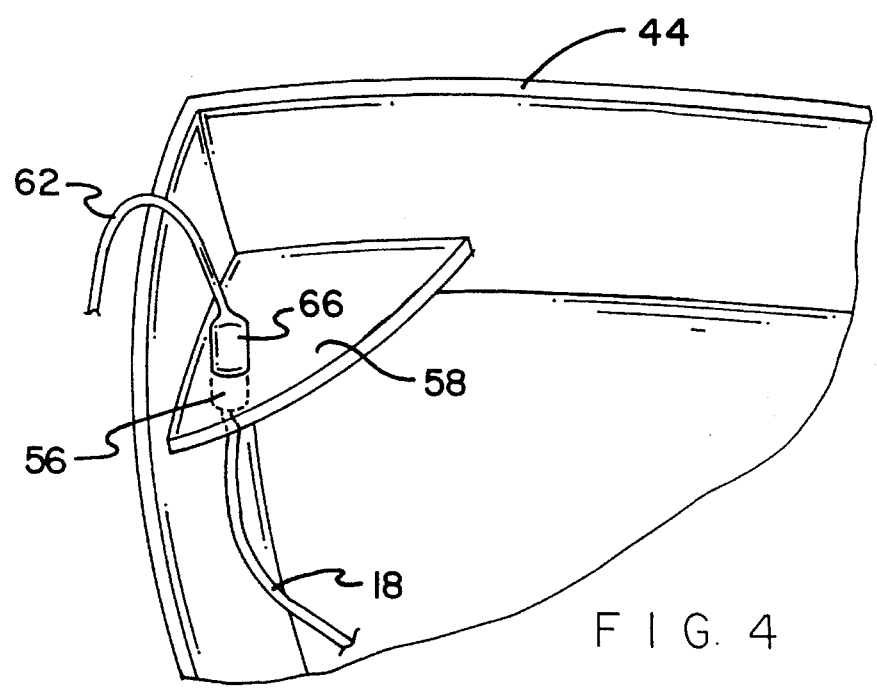
FIG. 4 is an enlarged perspective view of the FIG. 3 connection cable and coupling component at the forward end of the boat.
Figure 5:
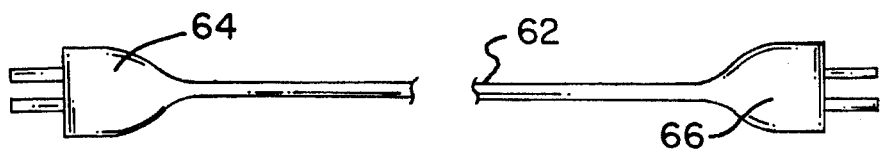
FIG. 5 is a plan view of the connecting wires including its plug as shown in FIGS. 3 and 4.

Specifically, it will be noted in FIGS. 1 and 2 that there is shown a new and improved system 10 for charging a battery of a boat while being towed. In its broadest context, the system 10 includes a primary battery 12, front electrical lines 14, a secondary battery 16 and rear electrical lines 18 coupled to the front electrical lines 14.

More specifically, as shown in FIGS. 1 and 2, there if provided a vehicle in the form of a car 22. It is the car that supports the primary battery 12. The battery is provided in the conventional manner with an anode and a cathode 24 and 26. The battery through its anode and cathode electrically powers the vehicle 22 during use in the conventional fashion. The front electrical lines 14 extend rearwardly from the anode and the cathode to a receptacle 30. The receptacle 30 is secured through a plate 32 to the rear of the vehicle. The vehicle 22 is also provided with a hitch 34 at its rearward end for towing a trailer 36.

The trailer 36 is of the conventional type having wheels 38 adjacent to its rearward end. A hitch coupler 40 is located at the forward end of the trailer 36. The coupler 40 is releasably secured to the hitch 34 to effect the coupling between the trailer 36 and the vehicle 22. This allows the vehicle 22 to pull the trailer 36.

In association therewith, a boat 44 is positioned on the trailer 36. The boat 44 has a secondary battery 16 for powering the boat when in use in the water in the conventional manner. The secondary battery 16 also has a anode and a cathode 46 and 48. Rear electrical lines 18 extend forwardly from the anode and the cathode to a forward position for coupling with the forward lines 14. As can be seen in FIG. 2, this is effected through a plug 52 at the forward end of the rear lines for effecting the releasable coupling between the front and rear lines 14 and 18 and, hence, the coupling of the primary battery 12 and the secondary battery 16.

FIGS. 3 through 6 illustrate an alternate embodiment of the invention. In such embodiment, the plug 52 at the forward end of the rear lines 18 is replaced by a receptacle 56. Such receptacle is fixedly positioned by a plate 58 to the forward end of the boat 44. Intermediate electrical lines 62 constitute connecting wires to effect the electrical coupling between the primary and secondary batteries at a location between the vehicle 22 and the boat 24. The intermediate electrical lines 62 are formed with a forward plug 64 and a rearward plug 66 at the opposite ends of the intermediate lines 62 to effect such battery coupling during operation and use.

Figure 6:
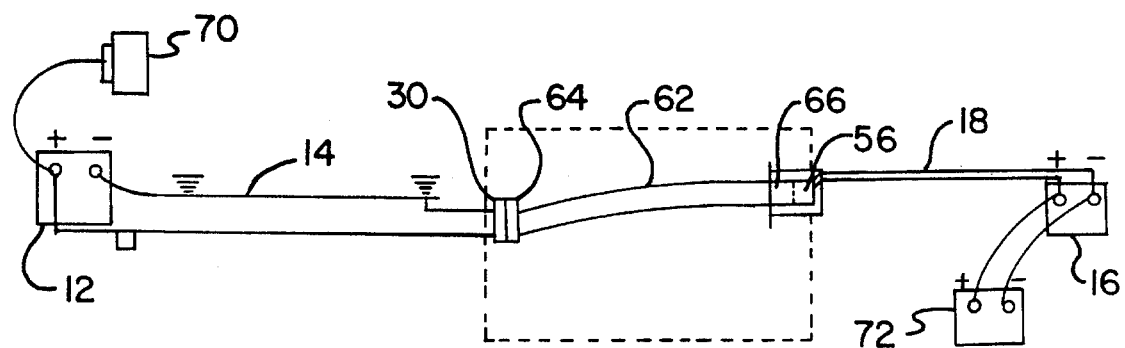
FIG. 6 is a schematic showing of the charged and charging batteries and the coupling therebetween.

As shown in FIG. 6, an alternator or generator 70 is disclosed for powering the vehicle 22 after the battery 12 has been used to start the vehicle. In addition, a supplemental battery 72 is shown as coupled to the secondary battery 16 for powering the boat. Plural batteries for powering a single boat is common. The present system allows for coupling such plural batteries for recharging both of them simultaneously.

Figure 7:
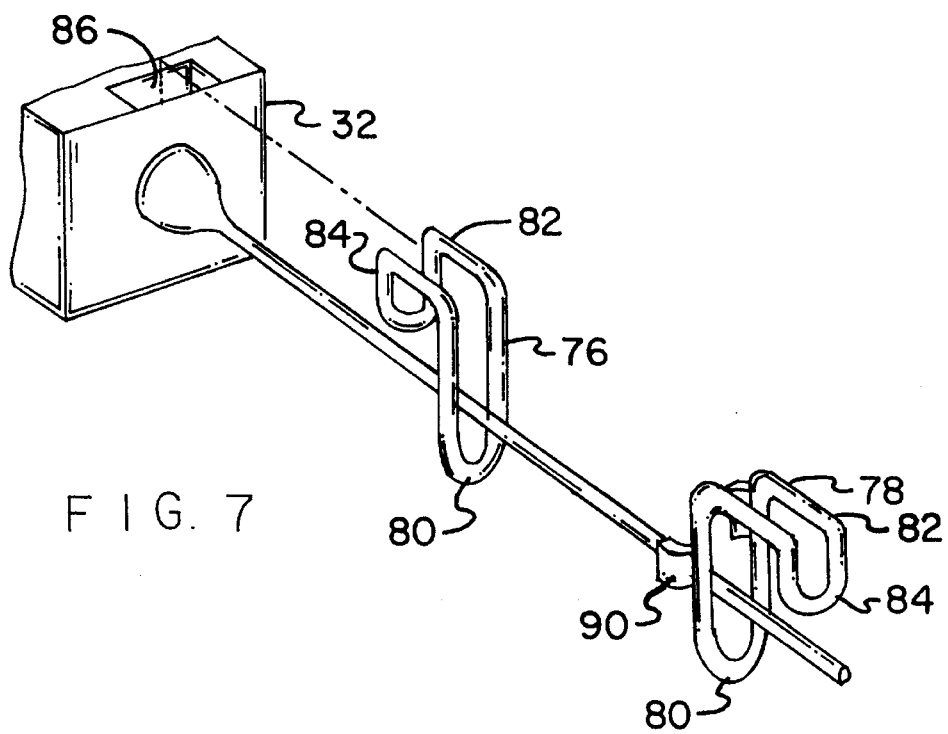
FIG. 7 is a perspective illustration of the clamps in an unattached orientation.
Figure 8:
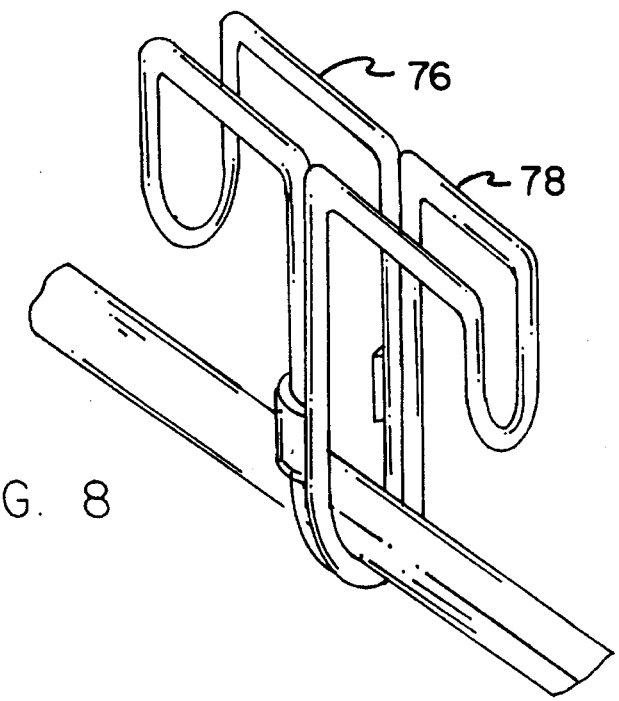
FIG. 8 is a perspective illustration of the clamps in a coupled orientation.

As shown in FIGS. 7 & 8, a pair of clamps is included having a lower portion in a U-shaped configuration with an upper horizontal portion constituting a handle. The lower U-shaped portions are positionable to support a central extent of the lines to provide support at opposite ends with respect to the boat and the vehicle. The clamp also includes a clip for coupling the clamps together for transportation purposes.

The present invention is in effect a harness that will easily connect to the vehicle and to the boat that will allow the batteries to be charged while the boat is being towed by a vehicle thus virtually eliminating the need for charging your boat battery or batteries after a fishing tip when you get home. This harness will have the best results for people who drive approximately over 30 minutes to and from the lake.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved system for charging a battery of a boat while being towed comprising, in combination:

a vehicle having a primary battery with an anode and a cathode for electrically powering the vehicle during use, front electrical lines extending rearwardly with a receptacle fixed to the vehicle, the vehicle also having a hitch at the rearward end thereof for towing a trailer;

a trailer having wheels adjacent to the rearward end thereof and a coupler at the forward end thereof for coupling with the hitch of the vehicle for being pulled;

a boat positioned on the trailer, the boat having a secondary battery for powering the boat when in use in the water, the secondary battery having an anode and a cathode and rear electrical lines extending forwardly from the secondary battery, the forward end of the boat having a receptacle fixed thereadjacent;

a plug at the forward end of the rear lines, the plug being couplable to the receptacle in the boat;

a receptacle fixedly positioned by a plate to the forward end of the boat;

intermediate electrical lines with plugs at each end for coupling the receptacles of the vehicle and the boat, the rear lines being couplable to the receptacle of the boat at the forward end of the boat; and a pair of clamps each having a lower portion in a U-shaped configuration with an upper horizontal portion constituting a handle, the lower U-shaped portions being positionable to support a central extent of the lines to provide support at opposite ends with respect to the boat and the vehicle.

2. A system for charging batteries of boats while being towed comprising:

a vehicle primary battery with an anode and a cathode for electrically powering a vehicle during use, front electrical lines extending rearwardly with a receptacle fixed to the vehicle, the vehicle adapted to have a hitch at the rearward end thereof for towing a trailer;

a secondary battery for powering a boat when in use in the water, the secondary battery having an anode and a cathode and rear electrical lines extending forwardly from the secondary battery with a receptacle fixed to the boat for coupling with the front lines, a plug at the forward end of the rear lines, the plug being couplable to the receptacle in the vehicle;

intermediate electrical lies with plugs at each end for coupling the receptacles of the vehicle and the boat, the rear lines being couplable to the receptacle of the boat at the forward end of the boat; and a pair of clamps each having a lower portion in a U-shaped configuration with a upper horizontal portion constituting a handle, the lower U-shaped portions being positionable to support a central extent of the lines to provide support at opposite ends with respect to the boat and the vehicle.

* * * * *